(12) United States Patent
Wong

(10) Patent No.: US 10,168,918 B2
(45) Date of Patent: *Jan. 1, 2019

(54) RECYCLED VERSION NUMBER VALUES IN FLASH MEMORY

(71) Applicant: Micron Technology, Inc., Boise, ID (US)

(72) Inventor: Wanmo Wong, Menlo Park, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/733,664

(22) Filed: Jun. 8, 2015

(65) Prior Publication Data

US 2015/0268888 A1 Sep. 24, 2015

Related U.S. Application Data

(62) Division of application No. 11/968,510, filed on Jan. 2, 2008, now Pat. No. 9,053,005.

(51) Int. Cl.
*G06F 12/02* (2006.01)
*G06F 3/06* (2006.01)

(52) U.S. Cl.
CPC .......... *G06F 3/0619* (2013.01); *G06F 3/064* (2013.01); *G06F 3/0679* (2013.01); *G06F 12/0246* (2013.01); *G06F 2212/7209* (2013.01)

(58) Field of Classification Search
CPC ......... G06F 17/30327; G06F 17/30356; G06F 2212/7208; G06F 17/30; G06F 17/3023; G06F 17/30159; G06F 17/30215; G06F 17/30371; G06F 17/30575; G06F 17/30156; G06F 17/30578; G06F 17/30162; G06F 17/30088; G06F 17/30206; G06F 17/30581; G06F 3/064; G06F 3/0679; G06F 3/0608; G06F 12/0246; G06F 12/023; G06F 12/0253; G06F 17/30138

USPC .................. 707/999.203, 638; 711/E12.001, 711/E12.008, 103

See application file for complete search history.

(56) References Cited

U.S. PATENT DOCUMENTS

| | | | |
|---|---|---|---|
| 5,860,124 A * | 1/1999 | Matthews | G06F 3/0619 711/159 |
| 6,282,700 B1 | 8/2001 | Grover et al. | |
| 7,130,979 B2 * | 10/2006 | Wong | G06F 12/0246 711/105 |
| 7,155,462 B1 | 12/2006 | Singh et al. | |
| 7,620,769 B2 | 11/2009 | Lee et al. | |

(Continued)

OTHER PUBLICATIONS

Venkataraman et al. "Consistent and Durable Data Structures for Non-Volatile Byte-Addressable Memory"; USENIX Association Berkeley; Feb. 15-17, 2011 (Year: 2011).*

*Primary Examiner* — Dennis Truong
(74) *Attorney, Agent, or Firm* — Schwegman Lundberg & Woessner, P.A.

(57) ABSTRACT

Various embodiments include methods, apparatus, and systems for assigning a plurality of version number values to instances of a logical entity of a memory device. Each version number value of the plurality version number values may be separately assigned to one of the instances of the logical entity. The version number values may be recycled after the plurality of version number values are assigned. Other embodiments including additional methods, apparatus, and systems are disclosed.

14 Claims, 8 Drawing Sheets

(56) References Cited

U.S. PATENT DOCUMENTS

| | | | |
|---|---|---|---|
| 7,752,381 B2* | 7/2010 | Wong | G06F 12/0246 711/103 |
| 7,966,462 B2 | 6/2011 | Lee et al. | |
| 9,053,005 B2 | 6/2015 | Wong | |
| 9,454,536 B1* | 9/2016 | Rao | G06F 17/30135 |
| 2004/0019652 A1* | 1/2004 | Freimuth | G06F 9/544 709/213 |
| 2005/0086422 A1* | 4/2005 | Wong | G06F 12/02 711/103 |
| 2006/0271725 A1* | 11/2006 | Wong | G06F 12/0246 711/103 |
| 2006/0282644 A1* | 12/2006 | Wong | G06F 12/0246 711/206 |
| 2007/0113029 A1* | 5/2007 | Bennett | G06F 12/0246 711/159 |
| 2007/0300008 A1 | 12/2007 | Rogers et al. | |
| 2008/0082736 A1 | 4/2008 | Chow et al. | |
| 2008/0184220 A1 | 7/2008 | Chen et al. | |
| 2008/0228834 A1* | 9/2008 | Burchall | G06F 11/1471 |
| 2009/0172641 A1* | 7/2009 | Wong | G06F 12/0246 717/122 |
| 2009/0271763 A1* | 10/2009 | Varma | G06F 12/023 717/114 |
| 2009/0287735 A1* | 11/2009 | Liedes | G06F 9/526 |
| 2010/0030961 A9 | 2/2010 | Ma et al. | |
| 2012/0042195 A1 | 2/2012 | Marinelli et al. | |
| 2013/0103644 A1* | 4/2013 | Shoens | G06F 17/3023 707/638 |

* cited by examiner

| TIME | VERSION | | | |
|---|---|---|---|---|
| | V1 | V2 | V3 | V4 |
| T1 | 1 | 0 | 0 | 0 |
| T2 | 1 | 1 | 0 | 0 |
| T3 | 1 | 1 | 1 | 0 |
| T4 | 1 | 1 | 0 | 0 |
| T5 | 1 | 1 | 1 | 0 |
| T6 | 0 | 1 | 1 | 0 |
| T7 | 0 | 0 | 1 | 0 |
| T8 | 0 | 0 | 1 | 1 |
| T9 | 1 | 0 | 1 | 1 |
| T10 | 0 | 0 | 1 | 1 |
| T11 | 1 | 0 | 1 | 1 |
| T12 | 1 | 0 | 0 | 1 |
| T13 | 1 | 0 | 0 | 0 |

780 highlights T3–T4; 781 highlights T9–T10.

| TIME | VERSION | | | |
|---|---|---|---|---|
| | V1 | V2 | V3 | V4 |
| T1 | 1 | 0 | 0 | 0 |
| T2 | 1 | 1 | 0 | 0 |
| T3 | 1 | 1 | 1 | |
| T4 | 0 | 1 | 1 | 0 |
| T5 | 0 | 0 | 1 | 0 |
| T6 | 0 | 0 | 1 | 1 |
| T7 | 1 | 1 | 1 | 1 |
| T8 | 1 | 0 | 0 | 1 |
| T9 | 1 | 0 | 0 | 0 |

660 highlights T3; 661 highlights T7.

RECYCLED VERSION NUMBER VALUES IN FLASH MEMORY

PRIORITY APPLICATION

This application is a divisional of U.S. application Ser. No. 11/968,510, filed Jan. 2, 2008, which is incorporated herein by reference in its entirety.

FIELD

Embodiments of this disclosure relate to non-volatile memory devices, including managing information in flash memory devices.

BACKGROUND

Non-volatile memory devices such as flash memory devices are used to store data or information. Flash memory devices reside in many computers and electronic devices, for example, cellular phones, digital cameras, digital audio players, and digital recorders. Flash memory devices may also be used as portable storage devices such as portable Universal Serial Bus (USB) flash drives or "thumb" drives. In some cases, flash memory devices may substitute for conventional magnetic hard drives in computers and other electronic devices or systems.

A flash memory device stores information in numerous memory cells, which are usually formed in a semiconductor chip. A flash memory device usually has a programming or writing operation to store information in the cells, a read operation to read information from the cells, and an erase operation to erase or delete information from the cells.

The information stored in the flash memory device may be updated. In some cases the same information may be updated many times. Thus, in some update technique such as out-of-place update, many instances of the information may exist. Some flash memory devices may manage the instances of the information by giving each instance a different version identification value. The device may store the version identification value in some reserved space in the device. At some point, the quantity of instances of the information may become large. Thus, version identification value may also become large which may overflow the reserved space. Therefore, there is a need for methods, apparatus, and systems to improve management of information in flash memory device.

BRIEF DESCRIPTION OF DRAWINGS

FIG. 6 is a chart showing version number values according to an embodiment of the invention.

FIG. 7 is a chart showing correction of potential version error according to an embodiment of the invention.

DETAILED DESCRIPTION

Figure 1:
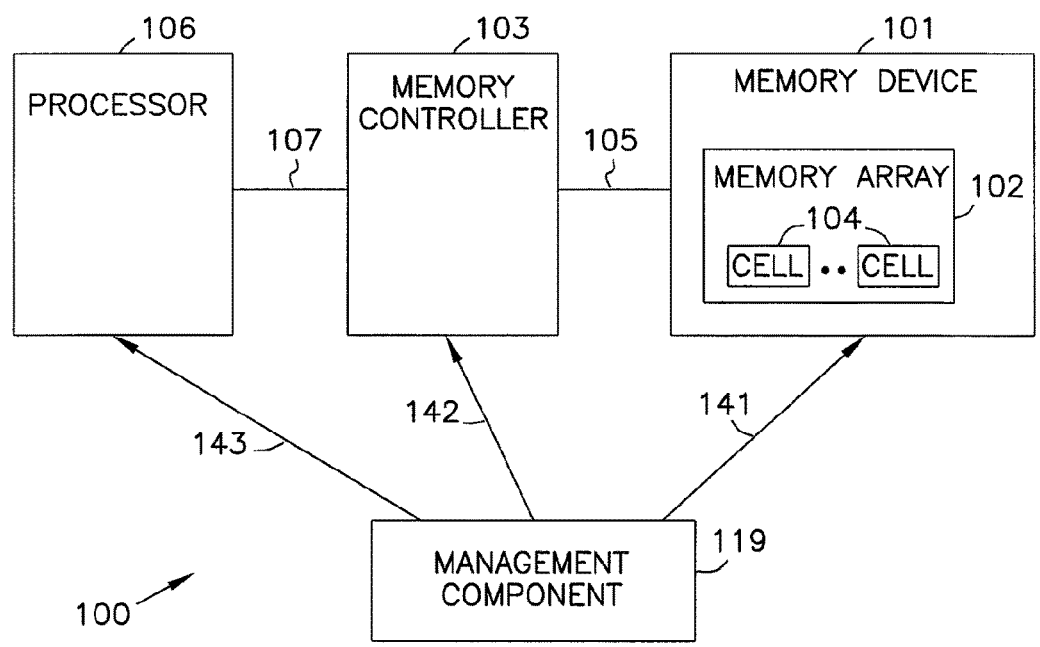
FIG. 1 shows a block diagram of a system according to an embodiment of the invention.

FIG. 1 shows a block diagram of a system 100 according to an embodiment of the invention. System 100 may reside in an electronic system such as a computer, a cellular phone, or a digital camera. As shown in FIG. 1, system 100 may include a memory device 101 having a memory array 102 with memory cells 104 to store information such as data from a user and control data generated by system 100. System 100 may also includes a memory controller 103 to control communication between memory device 101 and a processor 106 via one or more interfaces or bus 105 and bus 107.

System 100 may further include a management component 119, which may participate in the management of information in system 100, including assigning version number values to different instances of the information in system 100. As mentioned above, in some cases the quantity of instances of the information in a system may become large, leading to a large version identification value. As a result, overflow of the reserved space for the version identification value may occur.

In system 100, management component 119 may further participate in recycling version number values. Recycling version number values in system 100 may avoid potential overflow of reserve space for version number values. Further, since the version number values are recycled in system 100, a relatively smaller reserved space may be used to store the version number values. Therefore, more space may be available for some other use.

In FIG. 1, arrows 141, 142, and 143 indicate that either the entire management component 119 may reside in only one of memory device 101, memory controller 103, and processor 106, or portions of management component 119 may be scattered among at least two of memory device 101, memory controller 103, and processor 106. Management component 119 may include software program instructions, firmware, hardware, or a combination thereof. An example of firmware in management component 119 includes basic input output system (BIOS) circuitry or circuitry similar to a BIOS circuitry of an electronic system. An example of hardware in management component 119 includes circuit elements such as flip-flop circuitry, register circuitry, state machine circuitry, and other circuit elements.

Memory device 101 of FIG. 1 may include non-volatile memory device such as a flash memory device. Processor 106 may include a general-purpose processor (e.g., a processor used in a computer) or an application specific integrated circuit or ASIC (e.g., a processor used in a cellular phone or a digital camera). Memory device 101 and memory controller 103 and may be formed from the same semiconductor die and enclosed in the same semiconductor package or chip. Memory device 101 and memory controller 103 may also be formed from separate semiconductor dice and enclosed in separate semiconductor packages or separate chips. In some embodiments of system 100, memory controller 103 may be omitted, and memory device 101 and processor 106 may communicate with each other via one or both of buses 105 and 107. Memory device 101 may include an embodiment a memory device of FIG. 2.

Figure 2:
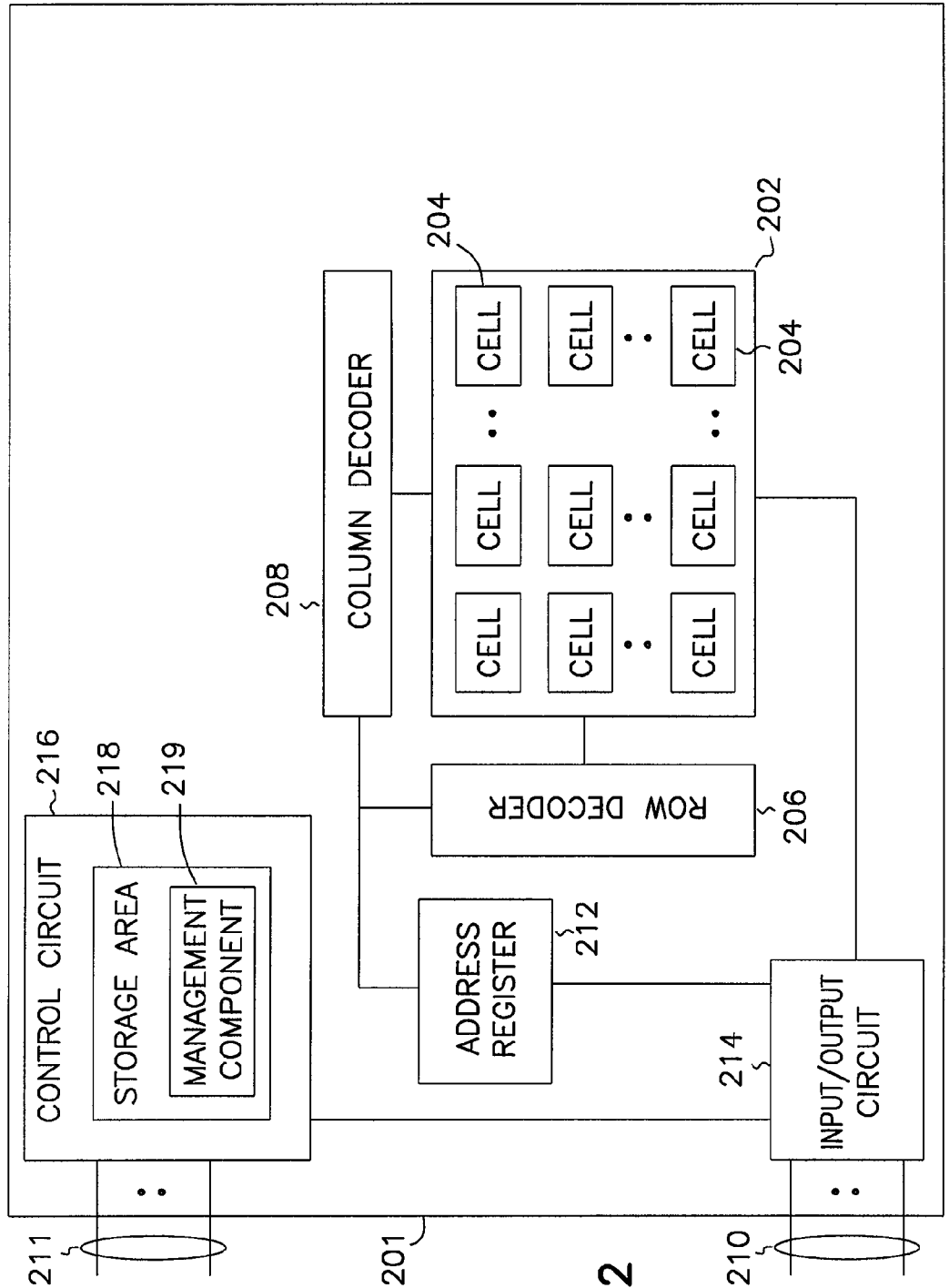
FIG. 2 shows a block diagram of a memory device according to an embodiment of the invention.

FIG. 2 shows a block diagram of a memory device 201 according to an embodiment of the invention. Memory device 201 may include a memory array 202 with cells 204 arranged in rows and columns. Row decoder 206 and column decoder 208 may respond to an address register 212 and access cells 204 based on row address and column address signals on lines or terminals 210. A data input/output (I/O) circuit 214 may transfer data or information between cells 204 and terminals 210. Terminals 210 and terminals 211 of memory device 201 may be coupled to an interface or a bus such as bus 105 and 107 of FIG. 1.

A control circuit 216 may control activities or operations of memory device 201 based on signals on terminals 210 and 211. The operations of memory device 201 may include a read operation to read information from cells 204, a write or programming operation to write or program information into cells 204, and an erase operation to erase or delete information from cells 204. The read, write, and erase operations of memory device 201 may be performed in connection with various activities in memory device 201, such as updating, copying, and deleting the information in cells 204.

Control circuit 216 may include a storage area 218, which may include storage circuit element such as read only memory (ROM), electrical erasable programmable ROM or EEPROM, and register circuitry. Storage area 218 may include a management component 219, which may include an embodiment of management component 119 of FIG. 1. In FIG. 2, management component 219 of memory device 201 may participate in the management of information in memory device 201, including assigning version number values to different instances of the information in memory device 201, and recycling the version number values when a version quantity limit is reached. The version quantity limit refers to a maximum quantity of different version number values that may be assigned. The version quantity limit may be determined by or stored in management component 219.

In FIG. 2, memory device 201 may include a non-volatile memory device. In some embodiments, memory device 201 may include a NAND flash memory device where cells 204 may include flash cells arranged in a NAND flash memory arrangement. In other embodiments, memory device 201 may include a memory device such as a NOR flash memory device, a polymer memory device, a ferro-electric random-access memory (FeRAM) device, a phase-change memory (PCM) device (e.g., Ovionics Universal Memory (OUM) device), a nitride read only memory (NROM) device, and a magnetoresistive random access memory (MRAM) device.

One skilled in the art will readily recognize that memory device 201 may include other components, which are omitted from FIG. 2 to focus on the various embodiments described herein.

Figure 3:
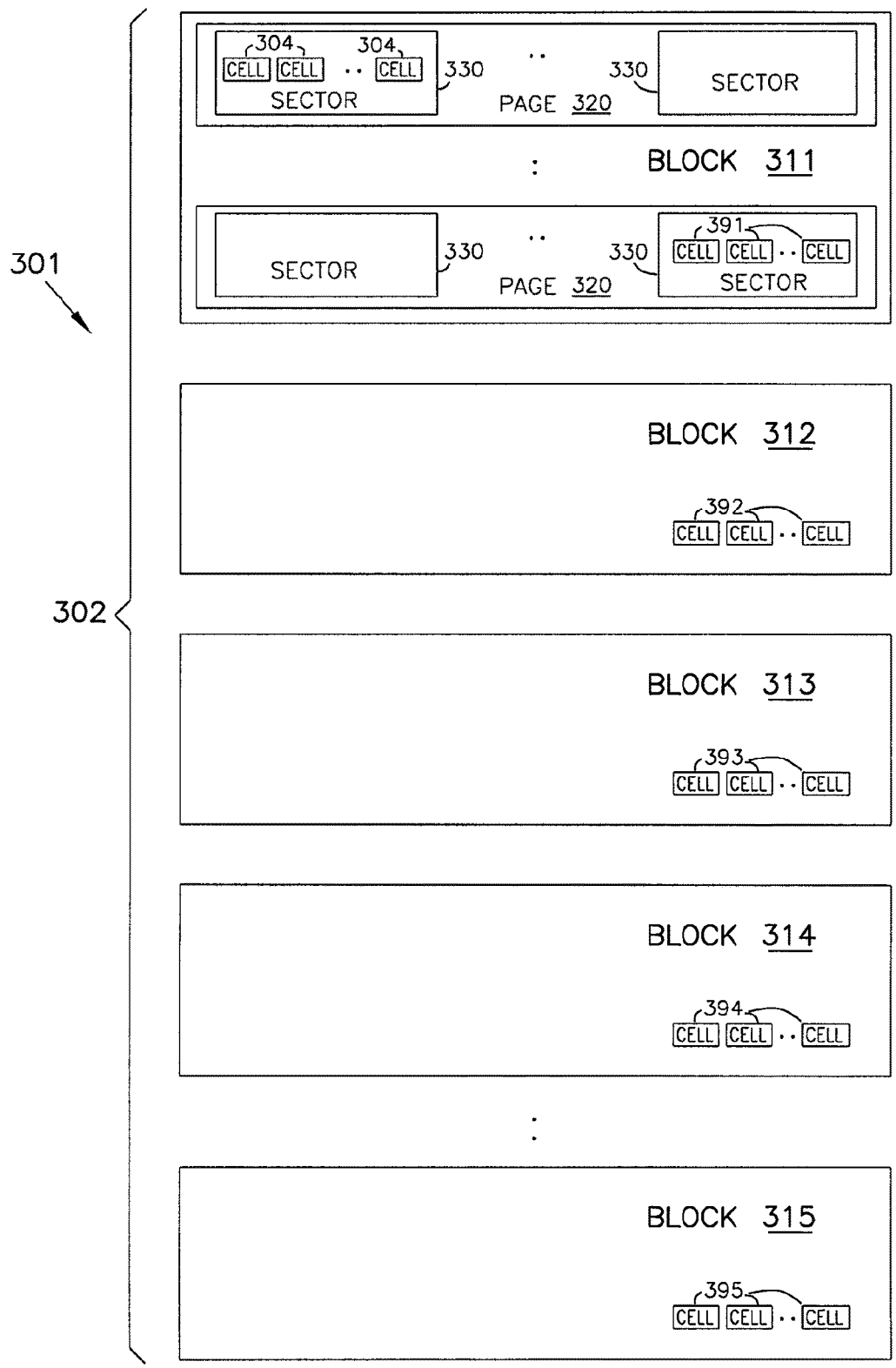
FIG. 3 shows a partial block diagram of a memory device having memory blocks according to an embodiment of the invention.
Figure 4:
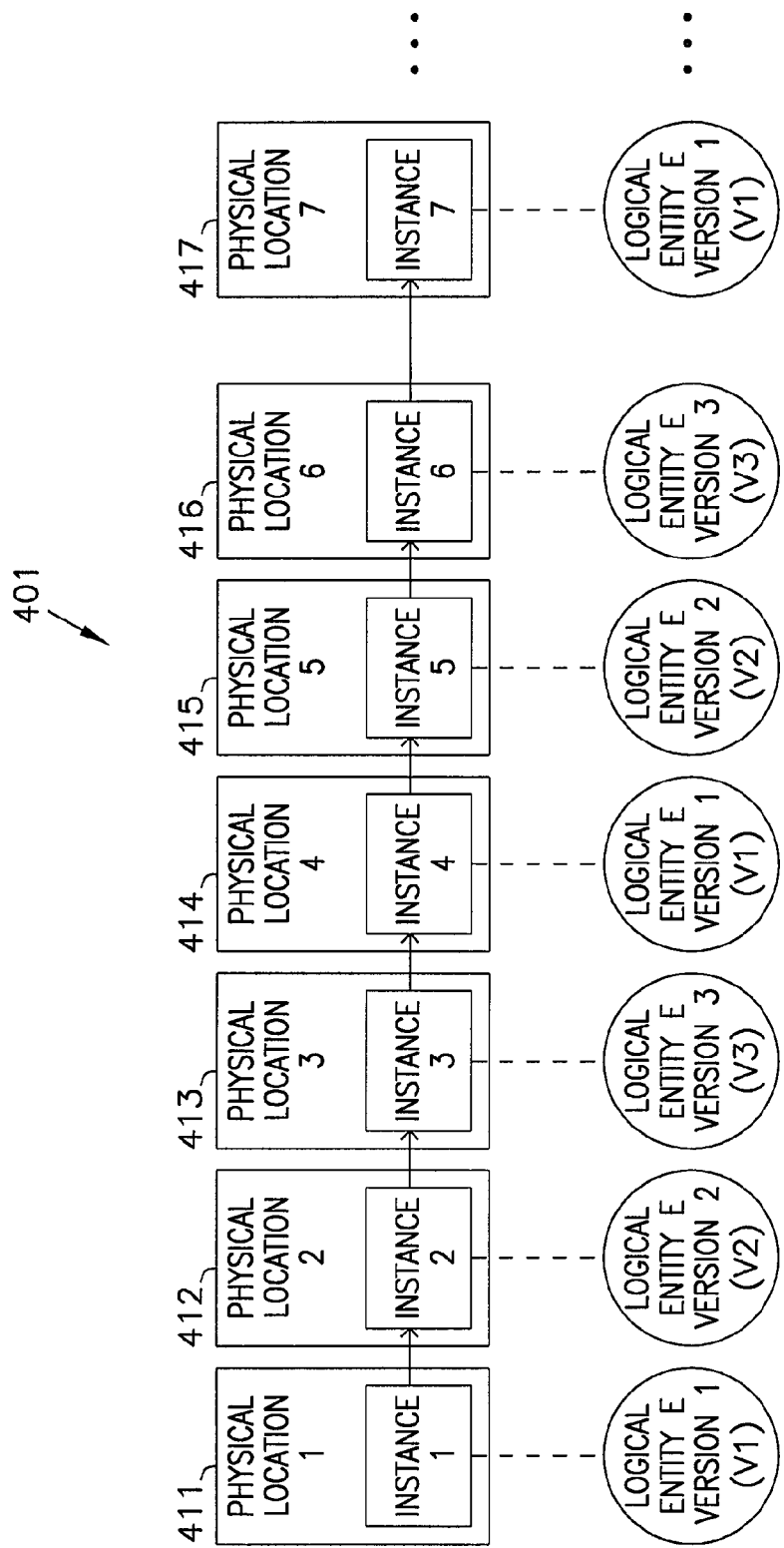
FIG. 4 shows instances of a logical entity of a memory device with recycled version number values according to an embodiment of the invention.
Figure 5:
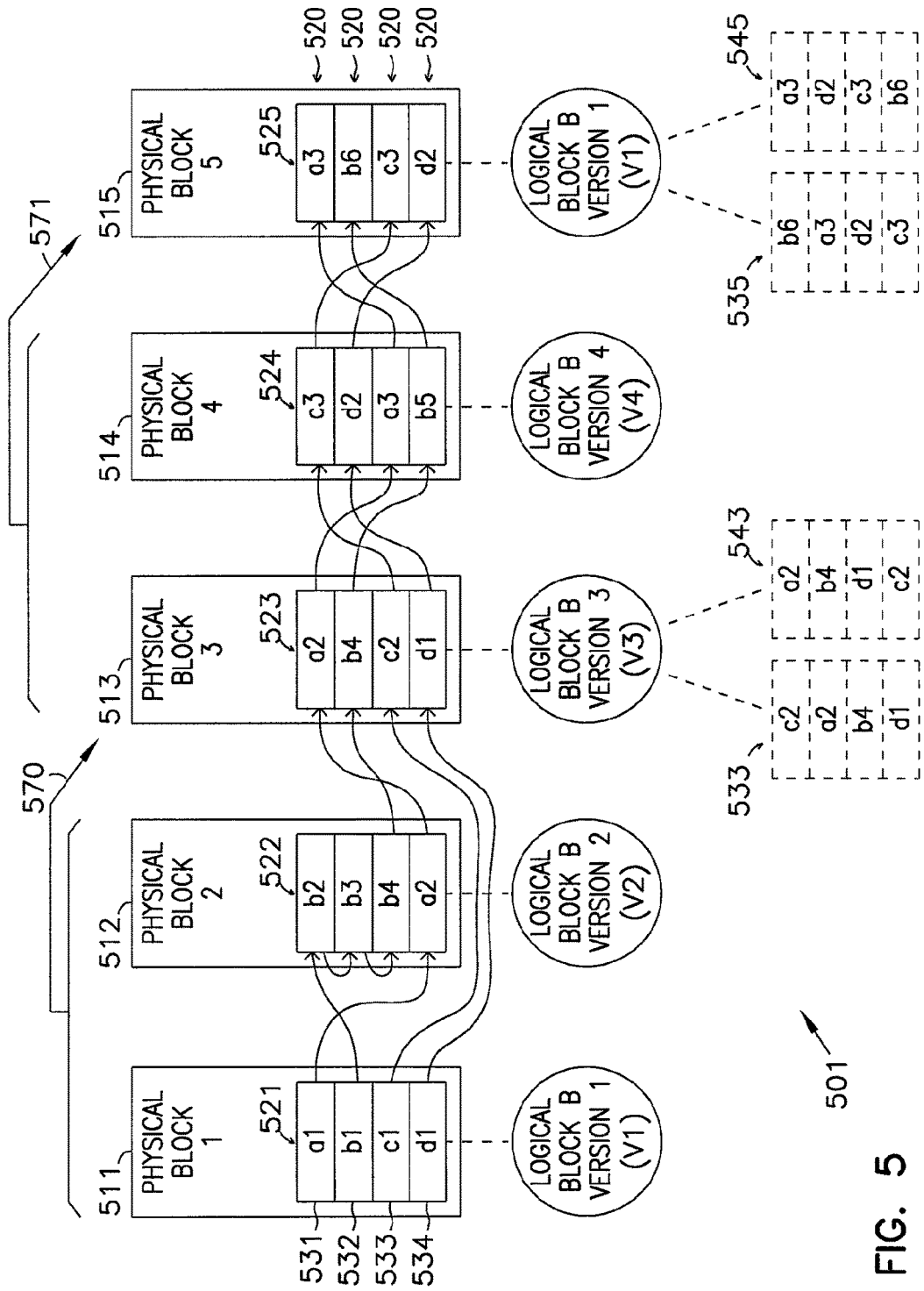
FIG. 5 shows instances of a logical block of a memory device with recycled version number values according to an embodiment of the invention.

In some embodiments, memory device 201 may include an embodiment of a memory device 301, 401, and 501 of FIG. 3, FIG. 4, and FIG. 5, respectively.

FIG. 3 shows a partial block diagram of a memory device 301 having memory blocks according to an embodiment of the invention. Memory device 301 may include an embodiment of memory device 201 of FIG. 1. For clarity, FIG. 3 omits some components of memory device 301. Memory device 301 may include a memory array 302 having memory blocks 311, 312, 313, 314, and 315. For clarity, FIG. 3 shows detail of only block 311. Other blocks 312, 313, 314, and 315 may include components and arrangement similar or identical to those in block 311. As shown in FIG. 3, block 311 may include rows or pages 320. Each page 320 may include sectors 330. Each sector 330 may includes cells 304.

Each of blocks 311, 312, 313, 314, and 315 may be called an erased block or a physical block. Each sector 330 may be called a physical sector.

Each sector 330 may store multiple bytes of information. The information may include user data and control or overhead data. For example, each sector 330 of FIG. 3 may store 512 bytes of user data. Each sector 330, page 320, or both may store one or more bits of control and overhead data (e.g., version number value) associated with the information stored in a sector, page, or block. In some embodiments, each of blocks 311, 312, 313, 314, and 315 of FIG. 3 may include 256 sectors (e.g., 256 sectors 330 in block 311).

Each of blocks 311, 312, 313, 314, and 315 may include cells (e.g., cells 391, 392, 393, 394, or 395) to store the version number value that may be assigned to information stored in the block. The information among the blocks may be related. For example, information may be initially stored in block 311, then various activities may be performed on a portion of the information or the entire information. The various activities may include one or more of updating, copying, and deleting information. A new instance of the information may be generated after each of the various activities. Thus, from the information initially stored in block 311, a quantity of instances of the information may be generated. The instances of the information may include different contents.

The activity of updating of information (or instance of information) in a memory device, such as memory device 301, may include reading information from cells at a first location (e.g., at block 311), modifying the information, then writing the modified information to cells at a second location (e.g., at block 312). Thus, when updating the information, the content of the information in the cells at the second location may be different from the content of the information in the cell at the first location.

The activity of copying information in a memory device, such as memory device 301, may include reading information from cells at a first location (e.g., at block 312), then writing the information to cells at a second location (e.g., at block 313). Thus, when copying information from a first location to a second location, the content of the information in the first and second location may be the same.

The activity of deleting information in a memory device, such as memory device 301, may include erasing the information at a location (e.g., at a block) using an erase operation.

Memory device 301 may store different instances of information in different blocks. To keep track or maintain different instances of the information, a version number value may be assigned to a corresponding instance in a corresponding block. For example, memory device 301 may store five instances of the information, where each of the five instances may be stored in one of blocks 311, 312, 313, 314, and 315. The version number value assigned to the instance in a particular block may be stored in that particular block. For example, cells 391 may store a first version number value of the first instance; cells 392, 393, 394, and 395 may store second, third, fourth, and fifth version number values, respectively, of the second, third, fourth, and fifth instances of the information.

A version number value may be presented by digital or binary bits. Thus, cells 391, 392, 393, 394, and 395 of FIG. 3 may store bits such as 000, 001, 010, 011, and 100, respectively, to represent the first, second, third, fourth, and fifth version number values.

In some embodiments, the version number values of the information in blocks 311, 312, 313, 314, and 315 may be stored in a place outside blocks 311, 312, 313, 314, and 315. For example, the version number values may be stored in an additional block of memory device 301, similar to one of blocks 311, 312, 313, 314, and 315 of memory array 302. In another example, the version number values may be stored in a storage area of memory device 301 such as storage area 218 of memory device 201 of FIG. 2. In a further example, the version number values may be stored in a memory controller or a processor such as memory controller 103 or processor 106 of FIG. 1.

In some embodiments, the version number values may be recycled so that a smaller quantity of the version number values may be used to assign to a greater quantity of instances of information stored in memory device 301. For example, a quantity of five version number values (e.g., 000, 001, 010, 011, and 100) may be recycled so that more than five instances of information may be assigned. In this example, the assignment and the recycling of the version number values may follow an order of 000, 001, 010, 011, 100, 000, 001, 010, 011, 100, 000 and so on, such that each version number value may be recycled one or more times. As shown in this example, the number version values may have an initial value of 000, then after each time a version number value is assigned, the version number value may be increased (e.g., from 000 to 010, and from 010 to 011, and so on). When the version quantity limit is reached (five in this example), the version number value may be reset (e.g., reset to 000 in this example). Instead of an increment order, the five version number value in this example may be assigned in a decrement order, e.g., 100, 011, 010, 001, 000, 100, 011, 010, 001, 000, 100 and so on. Other orders may be used.

The assignment and the recycling of the version number values in memory device 301 may be managed by a management component of the memory device such as management component 119 or 219 of FIG. 1 and FIG. 2.

In some embodiments, memory device 301 may include an embodiment of a memory device of FIG. 4.

FIG. 4 shows instances of a logical entity of a memory device 401 with recycled version number values according to an embodiment of the invention. For clarity, FIG. 4 omits some components of memory device 401. FIG. 4 shows an example of seven physical locations 411, 412, 413, 414, 415, 416, and 417, each storing one of seven instances 1, 2, 3, 4, 5, 6, and 7 of the same logical entity E. Each of physical locations 411 through 417 may include a physical sector, page, block, or group of blocks such as those in FIG. 3. Logical entity E may represent a logical sector, page, block, or group of blocks. In some embodiments, each of physical locations 411 through 417 may include a physical block having a block size (e.g., 128 kilobytes), and logical entity E may have a logical size equal to the block size (128 kilobytes) of the physical block. The address of logical entity E may be independent from the physical or geometrical address of physical location 411 through 417. A management component, such as management component 119 or 219 (FIG. 1 or FIG. 2), may map or link the address of logical entity E to the address of each of physical locations 411 through 417 to track the content of information associated with logical entity E.

Each of the instances 1 through 7 of logical entity E may be assigned with a version number value such as V1, V2, or V3. As shown in FIG. 4, the version number values V1, V2, and V3 may be recycled such that they may have an order of V1, V2, V3, V1, V2, V3, and V1. The version number values in FIG. 4 may be recycled after each time a version quantity limit is reached. As described with reference to FIG. 2, the version quantity limit refers to a maximum quantity of different version number values that may be assigned.

In FIG. 4, the version quantity limit may be equal to three, indicating that a maximum of the three different version number values, such as V1, V2, and V3, may be assigned. Thus, in the example of FIG. 4, the version quantity limit is reached after versions V1, V2, and V3 are assigned to instances 1, 2, and 3 of logical entity E. Therefore, version number values V1, V2, V3 may be recycled and assigned to instances 4, 5, and 6 of logical entity E. The recycling of versions may be repeated and applied to other instances of logical entity E. For example, instance 7 of logical entity E may be assigned with version number value V1. Therefore, as shown in FIG. 4, the quantity of version number values (e.g., three) may be less than the quantity of instances (e.g., seven) of logical entity E.

Instances 1 through 7 may be related to each other. For example, one instance (e.g., instance 2) may be an update or updated version of another instance (e.g., instance 1). In another example, one instance (e.g., instance 3) may be a collection of portions of other instances (e.g., a portion of instance 1 and a portion of instance 2).

In FIG. 4, after particular version number value (e.g., V1) is recycled and assigned to a new instance (e.g., instance 4) of logical entity E, the existence of one or more of previous instances of logical entity E associated with that particular version number value may be removed, meaning that one or more of previous instances of logical entity E associated with that particular version number value may be unavailable to memory device 401 or to other external devices. For example, after version number value V1 is assigned to instance 4 of logical entity E, the existence of one or more of instances 1, 2, and 3 of logical block E may be removed. Removing the existence of an instance of a logical entity may also means removing an indication that the instance of the logic entity exists. Removing the existence of an instance of a logical entity may involve activities such as erasing the instance, marking the instance invalid, or removing the indication of existence of the instance from a chart, record, list, or table that tracks or records the existence of the instance. In some embodiments, after the existence of a particular instance (e.g., instance 1) of logical entity E is removed, the physical location (e.g., physical location 1) associated with that particular instance may be reused to store a new instance of logical entity E or to store other information. As mentioned above, logical entity E may represent a logical sector, page, block, or group of blocks.

FIG. 5 shows instances of a logical block of a memory device 501 with recycled version number values according to an embodiment of the invention. FIG. 5 shows an example of five physical blocks 511, 512, 513, 514, and 515, each storing one of five instances 521, 522, 523, 524, and 525 of the same logical block "B". FIG. 5 shows an example where each of the five physical blocks may include four pages or rows 520, with each row 520 having one of four physical sectors 531, 532, 533, and 534. In some embodiments, the number of pages and physical sectors in each of the five physical blocks may vary. For example, physical blocks 511, 512, 513, 514, and 515 in FIG. 5 may include embodiments of physical blocks 311, 312, 313, 314, and 315 of FIG. 3.

In FIG. 5, each of instances 521, 522, 523, 524, and 525 of logical block B may include four logical sectors, such as logical sectors a1, b1, c1, and d1 of instance 521. Each logical sector (e.g., a1) may represent information stored in a physical sector (e.g., physical sector 531). The order of occurrences of a logical sector may be indicated by the numbers in that logical sector. For example, logical sector a1 may occur before logical sector a2, and logical sector a3 may occur after logical sector a2.

As shown in FIG. 5, each of instances 521, 522, 523, 524, and 525 of logical block B may be assigned with a version number value (one of V1, V2, V3, and V4). The version number values in FIG. 5 may be recycled such that one version number value may be reused and assigned to more than one instance of logical block B. For example, version number value V1 may be initially assigned to instance 521, then the same version number value V1 may be reused and assigned to instance 525 of logical block B.

The version number values, such as V1, V2, V3, and V4, may be recycled after a version quantity limit is reached. As described with reference to FIG. 4, the version quantity limit refers to a maximum quantity of different version number values that may be assigned. In the example of FIG. 5, the version quantity limit may be four. Thus, as shown in FIG. 5, after version number values V1, V2, V3, and V4 are assigned to some initial instances (e.g., 521, 522, 523, and 524) of logical block B, version number values V1, V2, V3, and V4 may be recycled and assigned to other instances of logical B that may occur after the occurrences of the initial instances of logic block B.

In FIG. 5, instances 521, 522, 523, 524, and 525 of logical block B may be related to each other such that an instance of logical block B may include at least one of an update of a logical sector from the same instance, an update of logic sector from another instance, and a copy of a logical sector from another instance.

The arrow connecting the logical sectors among instances 521, 522, 523, 524, and 525 indicate activities performed to the logical sectors. The activities may include updating and copying the logical sectors.

For example, instance 522 may include logical sector b2, which may be an update of logical sector b1 from instance 521; logical sector b3 which may be an update of logical sector b2; logical sector b4 which may be an update of logical sector b3; and logical sector a2 which may be an update of logical sector a1 of instance 521.

In another example, instance 523 may include logical sector a2, which may be a copy (not an update) of logical sector a2 of instance 522; logical sector b4 which may be a copy of logical sector b4 of instance 522; logical sector c2 which may be an update of logical sector c1 of instance 521; and logical sector d1 may be a copy of logical sector d1 of instance 521.

In another example, instance 524 may include logical sectors c3, d2, a3, and b5, which may be respective updates of logical sectors c2, d1, a2, and b4 of instance 523.

In another example, instance 525 may include logical sector a3, which may be a copy of logical sector a3 of instance 524; logical sector b6 which may be an update of logical sector b5 of instance 524; logical sector c3 which may be a copy of logical sector c3 of instance 524; and logical d2 which may be a copy of logical sector d2 of instance 524.

As shown in FIG. 5, instances 523 may have example variations 533 and 543. Instance 525 may have example variations 535 and 545. Variations 533, 543, 535, and 545 are described below after the following description.

The description above shows that one instance (e.g., 522 or 524) of logical block B may include updates of one or more other logical sectors of logical block B. Another instance (e.g., 523 or 525) of logical block B may include a combination or collection of one or more updates and one or more copies of instances from at least one of the instances of logical block B.

In FIG. 5, a consolidation process or activity may be performed to consolidate or selectively collect logical sectors among existing instances of logical block B to generate a new instance of logical block B. For example, a consolidation process 570 may be performed to selectively collect logical sectors from instances 521 and 522 of logical block B to generate instance 523 of logical block B. As another example, a consolidation process 571 may be performed to selectively collect logical sectors of instances 523 and 524 of logical block B to generate instance 525 of logical block B.

As shown in FIG. 5, consolidation process 570 or 571 may be performed after every two instances of logical block B are generated, plus one or more additional conditions being satisfied, as described below.

For example, after two instances 521 and 522 are generated, a logical sector such as logical sector c1 of instance 521 is indicated to be updated, and physical block 512 may be full or have insufficient space (e.g., not enough available cells) to store an update (i.e., c2) of logical sector c1, because b2, b3, b4, and a2 of instance 522 may occupy most of the available cells in physical block 512. Then, in this example, consolidation process 570 may be performed to generate a new instance of logic block B, which is instance 523. In some embodiments, using the same example herein, consolidation process 570 may be performed before logic sector c1 is indicated to be updated. Thus, in these embodiments, instead of logical sector c2 being in instance 523, as shown in FIG. 5, an un-updated logical c1 from instance 521 (same copy of c1) would be in instance 523, because consolidation process 570 may be performed before logical sector c1 is indicated to be updated.

In another example, after two instances 523 and 524 are generated, a logical sector such as logical sector b5 of instance 524 is indicated to be updated, and physical block 514 may be full or have an insufficient space to store an update (i.e., b6) of logical sector c5 (because c3, d2, a3, b5 of instance 524 may occupy most of the available cells in physical block 514). Then, in this example, consolidation process 571 may be performed to generate a new instance of logic block B, which is instance 525. In some embodiments, using the same example herein, consolidation process 571 may be performed before logic sector b5 is indicated to be updated. Thus, in these embodiments, instead of logical sector b6 being in instance 525, as shown in FIG. 5, an un-updated logical b5 from instance 524 (same copy of b5) would be in instance 524, because consolidation process 571 may be performed before logical sector b5 is selected to be updated.

In FIG. 5, since instance 523 may include a collection of instances 521 and 522, as a result of consolidation process 570, instance 523 may be considered as the instance with the most current content of logical block B. Thus, the existence of one or both of instances 521 and 522 may be removed after instance 523 is successfully generated. Similarly, since instance 525 may include a collection of instances 523 and 524, as a result of consolidation process 571, instance 525 may be considered as the instance with the most current content of logical block B. Thus, the existence of one or both of instances 523 and 524 may be removed after instance 525 is successfully generated.

A quantity of instances of logical block B, which exists when each of consolidation process 570 and 571 is performed, may be determined based on an instance quantity limit. In FIG. 5, the instance quantity limit refers to a maximum quantity of valid instances of logical block B that may be selected to be kept or exist at a time in memory device 501. The instance quantity limit may have a fixed or variable value. The value of instance quantity limit may be stored in a management component, such as management component 119 of FIG. 1. The value of the instance quantity limit may be set by programming codes. For example, different programming codes may be entered into memory device 501 to set different values for the instance quantity limit. In another example, different programming codes may be entered into a controller or processor, such as memory controller 103 or processor 106 of FIG. 1, to set different values for the instance quantity limit.

A consolidation process, such as consolidation process 570 or 571, may be performed when, along with other conditions, the quantity of existing instances of logical block B is equal to the instance quantity limit. In FIG. 5, the instance quantity limit may be set at two, meaning that the up to two valid instances of logical block B may exist at a time in memory device 501. Therefore, as described above, each of consolidation process 570 or 571 may be performed after every two instances of logical block B exist along with one or more additional conditions being satisfied, such as when a logical sector is indicated to be updated and the space of a physical block associated with an instance of the logical block B is insufficient to store the updated logical sector.

FIG. 5 shows an example where the value for the instance quantity limit may be set at two. In some embodiments, the instance quantity limit may be set at another value. For example, when the instance quantity limit is three, a consolidation process, such as consolidation process 570 or 571, may be performed after the generation of every three instances of the logical block.

As mentioned above, FIG. 5 shows example variations 533 and 543 of instance 523, and example variations of variations 535 and 545 of instance 525. Variations 533 and 543 show that logical sectors of instance 523 may be stored in different orders. For example, variation 533 shows logical sectors of instance 523 with an order of c2, a2, b4, and d1, indicating that logical sector c2 may be stored before the other logical sectors. In another example, variation 543 shows logical sector of instance 523 with an order of a2, b4, d1, and c2, indicating that logical sector c2 may be stored after (instead of before) the other logical sectors.

Variations 535 and 545 show that logical sectors of instance 525 may be stored in different orders. For example, variation 535 shows logical sectors of instance 525 with an order of b6, a3, d2, and c3, indicating that logical sector b6 may be stored before the other logical sectors. In another example, variation 545 shows logical sector of instance 525 with an order of a3, d2, c3, and b6 indicating that logical sector b6 may be stored after (instead of before) the other logical sectors.

The order of logical sectors in instance 523 may be called a sequential order because logical sectors a2, b4, c2, and d1 of instance 523 follow the same order of logical sectors a1, b1, c1, and d1 of instance 521. Similarly, in instance 525, the order of logical sectors a3, b6, c3, and d2 may also be called a sequential order.

The order of logical sectors in instance 522 may be called a random order because logical sectors b2, b3, b4, and a2 in instance 522 follow an order that is different from order of logical sectors a1, b1, c1, and d1 of instance 521. Similarly, the order of the logical sectors in each of instance 522, 524, and variations 533, 543, 535, and 545 may also be called a random order.

Therefore, the order of logical sectors of in an instance of a logical block, generated by consolidation of multiple instances, may follow a sequential or random order.

FIG. 6 is a chart showing version number values according to an embodiment of the invention. The system or memory device associated with chart 600 may include an embodiment of system 100 or memory device 101, 201, 301, 401, or 501 described above with reference to FIG. 1 through FIG. 6. In FIG. 6, V1, V2, V3, and V4 may represent V1, V2, V3, and V4 of FIG. 5.

In FIG. 6, each of times T1 through T9 indicates real time. For example, time T2 may indicate a particular time that occurs after time T1. The interval between two times, e.g., between times T1 and T2, may be measured in unit such as a fraction of a second, minute, day, month, or year.

Chart 600 may represent a record, list, or table that may be maintained and managed by a management component, such as management component 119 of FIG. 1 or management component 219 of FIG. 2. Thus, software program instructions, firmware, hardware, or a combination thereof, may be used to implement chart 600. For example, a state machine circuitry of the management component may be used to control the activities in chart 600.

In the following description, the logical entity described with reference to chart 600 is assumed to be a logical block, such as logical block B of memory device 501 of FIG. 5. The instance quantity limit of the instances of the logical block is set at an example value of two. Thus, in chart 600 up to two instances of the logical block may exist and be considered valid at a time.

At time T1, a first instance of the logical block may be stored in the memory device. The first instance may be assigned with a version number value V1. The logical block with the first instance may be called logical block-version 1. Thus, at time T1, logical block-version 1 may exist. Logical block-version V1 at time T1 may be similar to logical block B, version 1, of FIG. 5. In FIG. 6, the number "1" in a column V1 at time T1 indicates the existence of logical block-version V1. The number "0" in a column at a particular time (e.g., column V2, V3, or V4 at time T1) indicates that the existence of the version of the logical block, at that particular time, does not exist or has been removed. For example, "0" in each of columns V2, V3, and V4 indicates that logical block-versions V2, V3, and V4 do not exist at time T1.

At time T2, the first instance of the logical block, or logical block-version V1, may be updated. Thus, a second instance of the logical block, or logical block-version V2, may be generated. Logical block-version V2 at time T2 may be similar to logical block B, version 2, of FIG. 5.

At time T3 in FIG. 6, one of the first and second instances (logical block-version V1 or version V2) may be updated. Thus, a third instance of the logical block, or logical block-version V3, may be generated.

In FIG. 6, since the instance quantity limit of the instances in chart 600 is set at an example value of two, the instance quantity limit is reached at time T2 because two instances of the logical block (logical block-version 1 and version 2) exist at time T2. Thus, to generate logical block-version 3, a consolidation process 660 may be performed during time T3.

As a result of consolidation process 660, logical block-version V3 may include a collection of one of at least a portion of the first instance (logical block-version V1) and at least a portion of the second instance (logical block-version V2). Since logical block-version V3 may include a collection of logical block-version V1 and version V2, the content of logical block-version V3 may be considered as the most current content of the logical block. Thus, after logical block-version V3 is generated, the existence of logical block-version V1 or V2, or both may be removed.

At time T4, the number "0" in column V1 indicates that the existence of logical block-version 1 is removed. Thus, at time T4, logical block-version 2, and logical block-version 3 remain. After the existence of logical block-version V1 (the first instance) is removed, version number value V1 may be recycled and reused to assign to another instance of the logical block.

At time T5, the existence of the instance associated logical block-version V2 may be removed. Thus, at time T5, only logical block-version 3 remains. Like version number value V1, after the existence of logical block-version V2 (the second instance) is removed, version number value V2 may be recycled and reused to assign to another instance of the logical block.

At time T6, the third instance of the logical block, or logical block-version V3, may be updated. Thus, a fourth instance of the logical block, or logical block-version V4, may be generated. Logical block-version V4 at time T6 may be similar to logical block B, version 4, of FIG. 5.

At time T7, one of the third and fourth instances (logical block-version 3 or 4) may be updated. Thus, a fifth instance of the logical block may be generated. Like the situation at time T2, the instance quantity limit (two) is reached at time T6 because two instances of the logical block (logical block-version 3 and version 4) exist at time T6. Thus, another consolidation process 661 may be performed to consolidate the instances of logical block B, version 3 and version 4 to generate the fifth instance of the logical block. As shown in FIG. 6, consolidation process 661 may be performed during time T7 to generate the fifth instance of logical block. A new version number value (perhaps version V5) may be assigned to the fifth instance of the logical block. However, the new version number value may be unnecessary because version number values V1 and V2 are available since time T6. Thus, instead of a new version number value, version number value V1 or V2 may be reused and assigned to the fifth instance of the logical block. Thus, the fifth instance of the logical block may be assigned with either version number value V1 or V2.

At time T8, a fifth instance of the logical block, generated from the consolidation of the third and fourth instances, is assigned with version number value V1. Thus, at time T8, logical block-version V1 (new version V1 assigned to the fifth instance) exists. Logical block-version V1 at time T8 may be similar to instance 625 of logical block B, version 1, of FIG. 5. In FIG. 6, after logical block-version V1 at time T8 is generated, the existence of logical block-version V3 may be removed, as indicated by "0" in column V3 at time T8. Thus, at time T8, logical block-version 1, and logical block-version 4 remain. The instance (fifth instance) of logical block-version 1 at time T8 may be considered the most current instance of the logical block in comparison with the fourth instance (logical block-version 4) because the instance of logical block-version 1 is a consolidation of the third and fourth instances of the logical block. Therefore, the existence of logical block-version 4 may be removed.

At time T9, the number "0" column V4 indicates that the existence of logical block-version V4 is removed. Thus, at time T9, only logical block-version 1 remains. As shown in FIG. 6, the situation at time T9 is similar to the situation at time T1.

Therefore, the activities or processes in chart 600 after time T9 may be repeated with activities similar to those from time T1 to time T9, such as assigning version number values to instances, updating instances, consolidating instances, removing the existence of one or more instances, and recycling the version number values.

FIG. 7 is a chart showing correction of potential version error according to an embodiment of the invention. The logical entity described with reference to chart 700 in FIG. 7 is assumed to be a logical block such as logical bock B of FIG. 5.

At times T1 and time T2 in FIG. 7, logical block-version 1 and version 2 may be generated.

At time T3, a system or device associated with chart 700 may have a power-up sequence (e.g., device is turned on) and discover (e.g., by scan for version of logical blocks) that logical block-version 1, version 2, and version 3 exist, as indicated by the number "1" in each of column V1, V2, and V3. This situation (V1, V2, and V3 exist after system or device power-up) is unlike the situation at time T3 of FIG. 6 in that the existence of V1, V2, and V3 at time T3 in FIG. 6 may occur during an ongoing updating process, not as a result of a discovery (e.g., by device scanning) during a power-up sequence such as the power-up sequence at time T3 in FIG. 7. Thus, when the instance quantity limit associated with chart 700 is set at two (as in chart 700), the existence logical block-version 1, version 2, and version 3 at time T3 (e.g., during power-up) may indicate that a potential version error may have occurred, because the quantity of existing instances (three) at time T3 is greater than the instance quantity limit (two). Thus, in the situation like the one at time T3 of FIG. 7 (three logical versions are discovered during a power-up), a correction process 780 may be performed to correct the potential version error, as described below.

In chart 700, the version number values V1, V2, V3, and V4 may be assigned in a recycled order of, e.g., V1, V2, V3, V4, V1, V2, V3, V4, and so on. Thus, in this recycled order, logical block-version V3 at time T3 may be considered as the version that is generated after the generation of logical block-version V1 and version V2. Like the situation at time T3 of FIG. 6, logical block-version V3 in FIG. 7 may be generated as a result of a consolidation of logical block-version V1 and version V2. Thus, at time T3 of FIG. 7, among the three versions, logical block-version 3 may be considered as a potential corrupted or error version, because is generated before a power-up and after logical block-version 1 and version 2. The potential corruption of logical block-version 3 may be caused by an interruption while logical block-version V3 is generated. For example, the interruption may occur as a result of a mechanical disturbance (e.g., the memory device being dropped) or an electrical disturbance (e.g., supply power to the memory device being disconnected, turned off, or run out such as out of battery). The existence of logical block-version V1, version V2, and version V3 at time T3 may be obtained or determined by a memory operation such as a memory scan during a power-up sequence of the memory device, a periodic memory scan, a random memory scan, or other memory operations.

Since logical block-version 3 from time T3 may be considered as the potential error version, correction process 780 may reduce the quantity of existing instances from three to two to comply with the instance quantity limit of two (used as an example in chart 700). Correction process 780 may reduce the quantity of existing instances by removing the existence of logical block-version V3 at time T4 (indicated by the number "0" in column V3 at time T4), and considering logical block-version V1 and version V2 as valid or available versions (indicated by the number "1" in column V1 and V2). Then, a consolidation process similar to consolidation process 660 of FIG. 6 may be performed, e.g., at time T5, to consolidate instances of logical block-version V1 and version V2. Like the situation at time T3 of FIG. 6, at time T9 of FIG. 7, the existence of logical block-version 1, version 2, and version 3 may occur during an ongoing updating process (from time T4), unlike the situation at time T3 of FIG. 7 where the existence of logical block-version 1, version 2, and version 3 may be discovered during a power-up sequence.

The activities at times T6, T7, and T8 in chart 700 may be similar or identical to those of times T4, T5, and T6 chart 600 of FIG. 6.

At time T9 of FIG. 7, like the situation at time T3 of FIG. 7, another three versions V1, V3, and V4 of the logical block may be discovered during a power-up sequence (e.g., device is turned on after an interruption). Thus, a potential error version may exist at time T9. Therefore, another correction process 781 may be performed. Since the version number values V1, V2, V3, and V4 may be assigned in a recycled order of V1, V2, V3, V4, V1, V2, V3, V4, the instance of logical block-version 1 may be a consolidation of the instances of logical block-version 3 and version 4. Thus, logical block-version 1 may be the potential error version. Therefore, correction process 781 may remove the existence of logical block-version V1 at time T10 (indicated by the number "0" in column V1 at time T10, and consider logical block-version V3 and version V4 as valid or available versions (indicated by the number 1" in column V3 and V4). Then, a consolidation process, similar to consolidation process 661 of FIG. 6, may be performed, e.g., at time T11, to consolidate instances of logical block-version V3 and version V4.

The activities at times T12 and T13 in chart 700 may be similar or identical to those of times T8 and T9 600 of FIG. 6.

In chart 700, at time T3, if only two logical block versions (e.g., only V1 and V2 instead of V1, V2, and V3) are discovered during a power-up sequence, then correction process 780 may be omitted. Similarly, at time T9, if only two logical block versions (e.g., only V3 and V4 instead of V1, V3, and V4) are discovered during a power-up sequence, then correction process 781 may be omitted.

Figure 8:
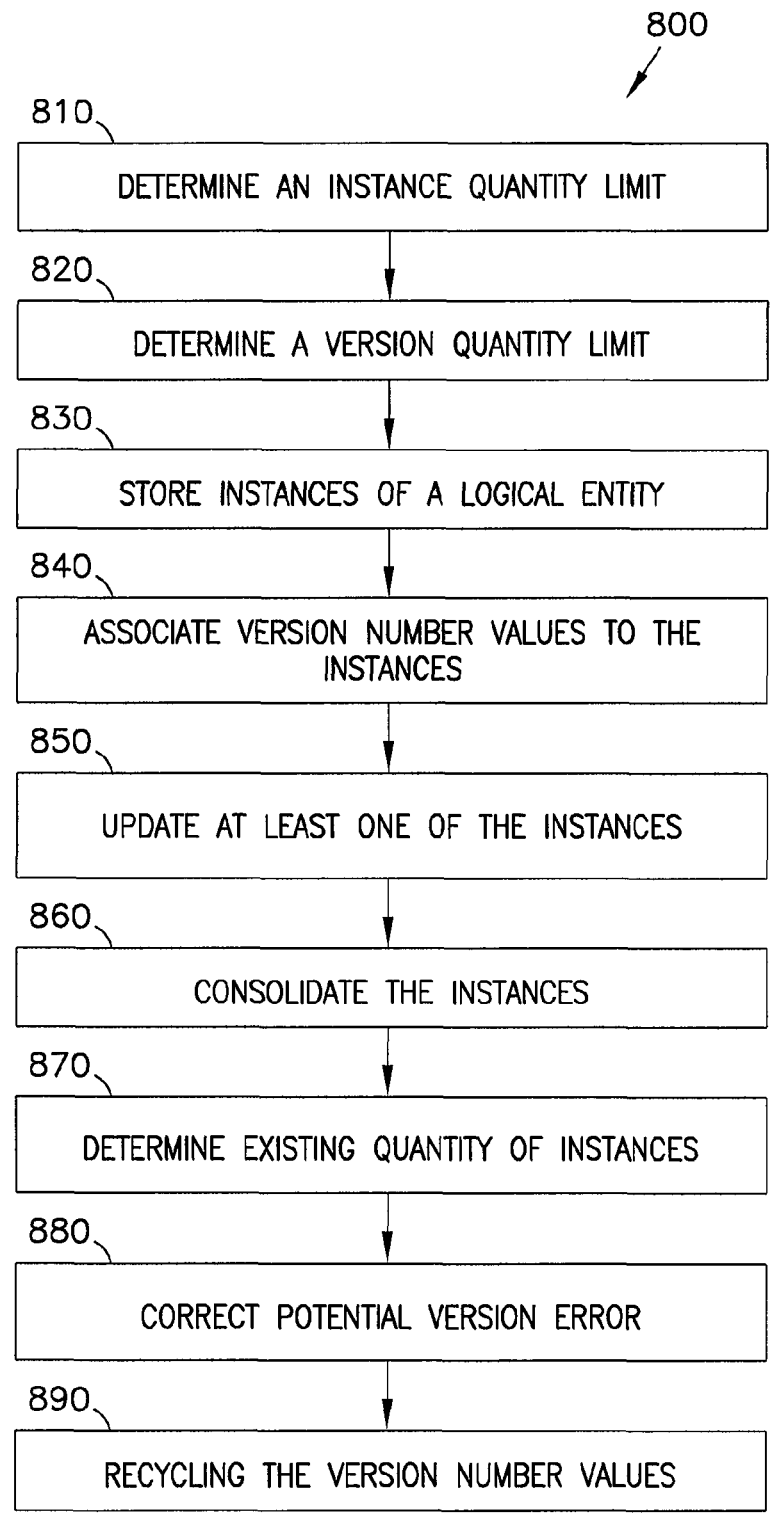
FIG. 8 shows a flow diagram of a method of recycling version number values according to an embodiment of the invention.

FIG. 8 shows a flow diagram of a method 800 of recycling version number values of a logical block according to an embodiment of the invention. Method 800 may be used in system 100, memory device 101, 201, 301, 401, or 501, and systems or memory devices associated with chart 600 or chart 700 described above with reference to FIG. 1 through FIG. 7.

Activity 810 of method 800 may include determining an instance quantity limit. As described above, the instance quantity limit refers to a maximum number of valid instances that may exist at a time in the memory device used in method 800. The instance quantity limit may be chosen and stored in a management component such as management component 119 of FIG. 1 or management component 219 of FIG. 2. For example, an instance quantity limit of two (as used in the example for FIG. 5, FIG. 6, and FIG. 7) may be chosen and stored. In method 800, the instance quantity limit may be represented by I, where I is an integer.

Activity 820 may include determining a version quantity limit. As described above, the version quantity limit refers to a maximum quantity of different version number values that may be assigned to instances of a logical entity. In method 800, the version quantity limit may be presented by V, where V is an integer.

In some embodiments, to manage the assignment of version number values assigned to instances, such as in FIG. 5, FIG. 6, and FIG. 7, the relationship between version quantity limit V and the instance quantity limit I may be expressed as $V=2*I$ (V equals two times I), meaning that version quantity limit V may be a function of instance quantity limit I. Thus, in some embodiments, based on the expression $V=2*I$, the version quantity limit V may be determined when the instance quantity limit I is known, and the instance quantity limit I may be determined when the version quantity limit I is known. For example, when instance quantity limit I is equal to two, the version quantity limit V is four ($4=2*2$). Thus, four different version number values (e.g., V1, V2, V3, and V4) may be used to assign to instances of a logical entity. As another example, when instance quantity limit I is equal to three, the version quantity limit V is six ($6=2*3$). Thus, six different version number values may be used.

Activity 830 may include storing instances of a logical entity. The instances may include the instances a logical entity stored at physical locations, such as instance 1 through instance 7 of logical entity E stored at physical locations 411 through 471 of FIG. 4, or instances 521 through 525 of logical block B stored at physical locations 511 through 525 of FIG. 5.

Activity 840 may include associating version number values to the instances. In some embodiments, associating the version number values to the instances may include assigning the version number values to the instances and storing the version number values. Assigning and storing the version number values may be performed in fashions similar or identical to the assigning and storing version number values V1, V2, and V3 described above with reference to FIG. 4, or version number values V1, V2, V3, and V4 described above with reference to FIG. 5 through FIG. 7.

Activity 850 may include updating at least one of the instances. The update in activity may include updating of instances of a logical entity, such as logical entity E of FIG. 4 or logical block B of FIG. 6, and updating activities of instances of the logical entity associated with chart 600 and 700 of FIG. 6 and FIG. 7.

Activity 860 may include consolidating the instances. The consolidation may include embodiments of consolidation processes such as consolidation process 670 and 671 of FIG. 6 and consolidation process 760 and 761 of FIG. 7, and consolidation processes at times T3 and T4 of FIG. 7.

Activity 870 may include determining existing quantity of instances. In some embodiments, activity 870 may scan a memory device to determine the existing quantity of instances of the logical block at a particular time. For example, activity 870 may scan a memory device associated with chart 600 or 700 at time T3 in FIG. 6 or FIG. 7.

Activity 880 may include correcting potential version error. A correction process may be performed in activity 880. For example, a correction process may be performed when the quantity of existing instances (determined from activity 870) is greater than the instance quantity limit (determined from activity 810). The correction process may include embodiments of the correction process described above with reference to FIG. 7. The correction process in activities 870 may be omitted when the quantity of existing instances is equal to or less than the instance quantity limit.

Activity 890 may include recycling the version number values. The recycling of the version number values may include embodiments of the recycling of version number values such as version number values V1, V2, and V3 described above with reference to FIG. 4, or recycling of version number values V1, V2, V3, and V4 described above with reference to FIG. 5 through FIG. 7.

The individual activities of method 800 may not have to be performed in the order shown or in any particular order. Some activities may be repeated, and others may occur only once. Various embodiments may have more or fewer activities than those shown in FIG. 8. For example, in some embodiments, method 800 may include the activities or operations described with reference to FIG. 1 through FIG. 7 above and FIG. 9 below.

Figure 9:
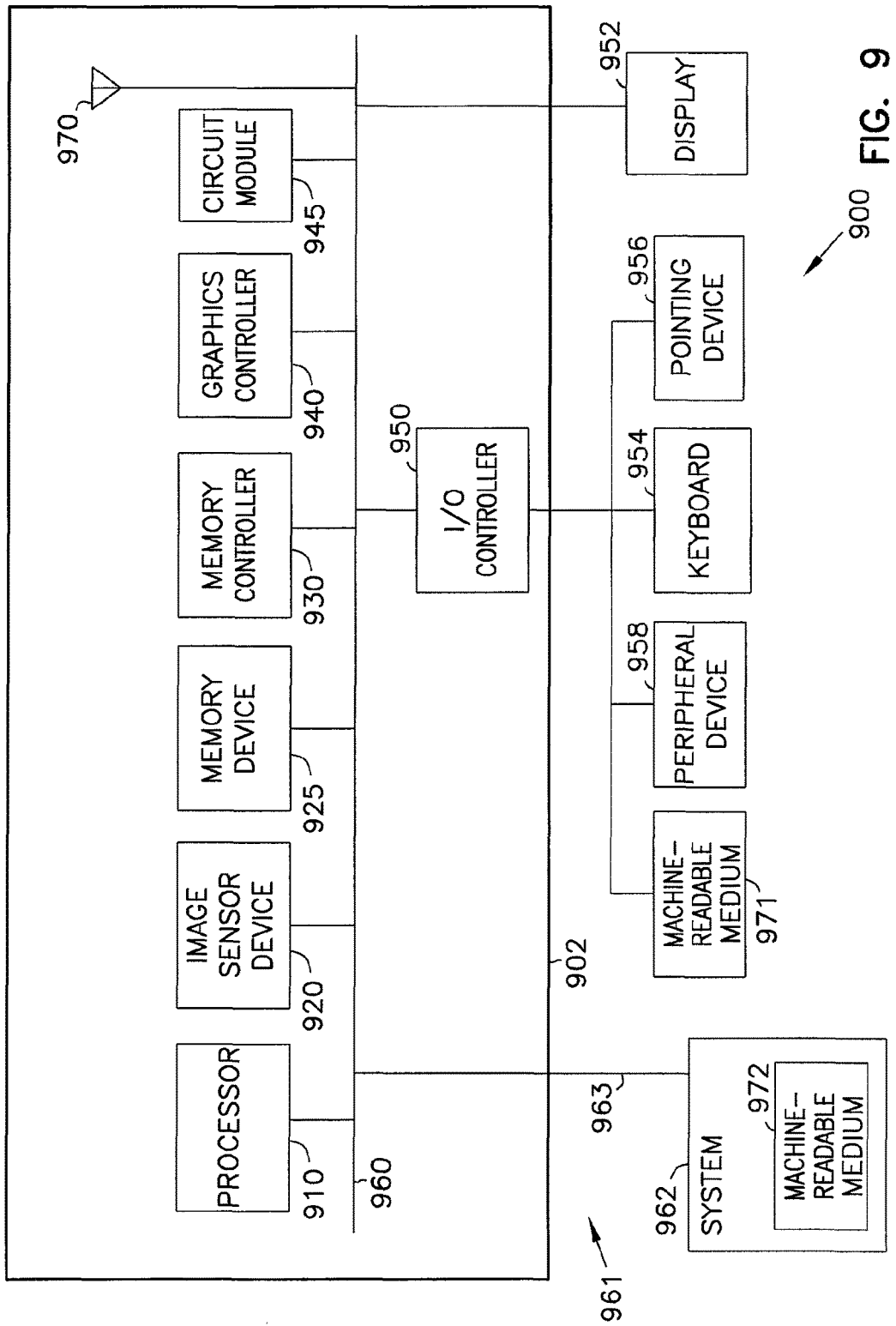
FIG. 9 shows a block diagram of an electronic system having a display and an imaging device according to an embodiment of the invention.

FIG. 9 shows a network 900 according to an embodiment of the invention. Network 900 may include systems 961 and 962 communicating with each other via a connection 963. Connection 963 may include a wired or wireless connection. In some embodiments, connection 963 may include an internet connection.

System 961 may include a processor 910, an image sensor device 920, a memory device 925, a memory controller 930, a graphics controller 940, a circuit module 945, an I/O controller 950, a display 952, a keyboard 954, a pointing device 956, peripheral device 958, and a bus 960 to transfer information among the components of system 961. System 961 may also include an antenna 970 to transmit and receive information wirelessly. System 961 may also include a circuit board 902 on which some components of system 961 may be located. In some embodiments, the number of components of system 961 may vary. For example, in some embodiments, system 961 may omit one or more of display 952, image sensor device 920, memory device 925, and circuit module 945. System 961 may include an embodiment of system 100 of FIG. 1.

Processor 910 may include a general-purpose processor, e.g., a processor used in a computer. Processor 910 may include an application specific integrated circuit (ASIC), e.g., a processor used in a cellular phone, or a digital camera or camcorder. Processor 910 may comprise a single core processor or a multiple-core processor. Processor 910 may execute one or more programming commands to process information to produce processed information. The information may include digital output information provided by other components of system 961, such as by image sensor device 920 or memory device 925.

Image sensor device 920 may include a complementary metal-oxide-semiconductor (CMOS) image sensor having a CMOS pixel array or a charge-coupled device (CCD) image sensor having a CCD pixel array.

Memory device 925 may include a volatile memory device, a non-volatile memory device, or a combination of both. For example, memory device 925 may comprise a dynamic random access memory (DRAM) device, a static random access memory (SRAM) device, a flash memory device such as NAND or NOR flash memory device, or a combination of DRAM, SRAM, and flash memory devices. In some embodiments, memory device 925 may include one or more embodiments of memory devices 101, 201, 301, 401, or 501 described above with reference to FIG. 1 through FIG. 8.

Display 952 may include an analog display or a digital display. Display 952 may include a liquid crystal display (LCD), or a plasma display. Display 952 may receive information from other components. For example, display 952 may receive information that is processed by one or more of image sensor device 920, memory device 925, graphics controller 940, and processor 910 to display information including text and images.

Circuit module 945 may include a circuit module of a vehicle. Circuit module 945 may receive information from other components to activate one or more subsystems of the vehicle. For example, circuit module 945 may receive information that is processed by one or more of image sensor device 920, memory device 925, and processor 910, to activate one or more of an air bag system of a vehicle, a vehicle security alarm, and an obstacle alert system in a vehicle.

As shown in FIG. 900, system 961 may include a machine-readable medium 971. System 962 may include a machine-readable medium 972. Each of machine-readable media 971 and 972 may include a memory, e.g., removable storage media, and any memory including an electrical, optical, or electromagnetic conductor.

Each of machine-readable medium 971 and 972 may contain thereon associated information (e.g., computer or software program instructions and/or data), which when accessed or executed, results in a machine (e.g., components of system 961) performing one or more of the activities described herein with respect to FIG. 1 through FIG. 9.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods including the activities described herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment.

The illustrations of systems, apparatus, and network herein, such as systems 100, 961, and 962, and memory devices 201, 301, 401, 501, and 925, are intended to provide a general understanding of the structure of various embodiments, and not as a complete description of all the elements and features of apparatus and systems that might make use of the structures described herein.

The novel apparatus, systems, and method of various embodiments may include, be included, or be used in electronic circuitry used in high-speed computers, communication and signal processing circuitry, single or multi-processor modules, single or multiple embedded processors, multi-core processors, data switches, and application-specific modules including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others.

The above description and the drawings illustrate some embodiments of the invention to enable those skilled in the art to practice the embodiments of the invention. Other embodiments may incorporate structural, logical, electrical, process, and other changes. In the drawings, like features or like numerals describe substantially similar features throughout the several views. Examples merely typify possible variations. Portions and features of some embodiments may be included in, or substituted for, those of others. Many other embodiments will be apparent to those of skill in the art upon reading and understanding the above description. Therefore, the scope of various embodiments of the invention is determined by the appended claims, along with the full range of equivalents to which such claims are entitled.

The Abstract is provided to comply with 37 C.F.R. § 1.72(b) requiring an abstract that will allow the reader to quickly ascertain the nature and gist of the technical disclosure. The Abstract is submitted with the understanding that it will not be used to interpret or limit the scope or meaning of the claims.

What is claimed is:

1. A method comprising:
    storing, performed by circuitry of a component that includes at least a memory device, in a first physical block of the memory device a first version number value associated with a first instance of a logical block of the memory device;
    storing, performed by the circuitry of the component that includes at least the memory device, in a second physical block of the memory device a second version number value associated with a second instance of the logical block;
    storing, performed by the circuitry of the component that includes at least the memory device, in a third physical block of the memory device the first version number value associated with a third instance of the logical block, wherein the third instance comprises an update of a logical sector of the first instance from the first physical block and a copy of a logical sector of the second instance from the second physical block, the update of the logical sector of the first instance forms a first portion of the third instance in the third physical block, and the copy of the logical sector of the second instance forms a second portion of the third instance in the third physical block; and
    deleting, performed by the circuitry of the component that includes at least the memory device, at least one of the first and second instances after the first version number value is assigned to the third instance of the logical block.

2. A method comprising:
    storing, performed by circuitry of a component that includes at least a memory device, a first instance of a logical block of a memory device at a first physical location of the memory device;
    assigning, performed by the circuitry of the component that includes at least the memory device, a first version number value to the first instance;
    storing, performed by the circuitry of the component that includes at least the memory device, a second instance of the logical block of the memory device at a second physical location of the memory device;
    assigning, performed by the circuitry of the component that includes at least the memory device, a second version number value to the second instance;
    storing performed by the circuitry of the component that includes at least the memory device, a third instance of the logical block of the memory device at a third physical location of the memory device;
    assigning, performed by the circuitry of the component that includes at least the memory device, the first version number value to the third instance of the logical block, wherein the third instance comprises an update of a portion of the first instance from the first physical location to form a first portion of the third instance in the third physical location and a copy of a portion of the second instance from the second physical location to form a second portion of the third instance in the third physical location; and
    erasing, performed by the circuitry of the component that includes at least the memory device, information from the first physical location after the third instance is successfully stored in the third physical location.

3. The method of claim 2, wherein the third physical location is the same as the first physical location.

4. A method comprising:
    storing, performed by a memory device, a first instance of a logical block of a memory device at a first physical location of the memory device;
    assigning, performed by circuitry of a component that includes at least the memory device, a first version number value to the first instance;
    storing, performed by the memory device, a second instance of the logical block of the memory device at a second physical location of the memory device;
    assigning, performed by the circuitry of the component that includes at least the memory device, a second version number value to the second instance;
    storing performed by the memory device, a third instance of the logical block of the memory device at a third physical location of the memory device;
    assigning, performed by the circuitry of the component that includes at least the memory device, the first version number value to the third instance of the logical block, wherein the third instance comprises an update of a portion of the first instance from the first physical location to form a first portion of the third instance in the third physical location, and a copy of a portion of the second instance from the second physical location to form a second portion of the third instance in the third physical location, wherein each of the first, second, and third physical locations comprises a physical block of the memory device.

5. The method of claim 4, wherein storing the third instance of the logical block comprises storing logical sectors in a sequential order.

6. The method of claim 4, wherein storing the second instance of the logical block occurs when the first physical location has an insufficient cell quantity to store the update of the portion of the first instance.

7. The method of claim 6, wherein storing the third instance occurs when the second physical location has an insufficient cell quantity to store an update at least a portion of the second instance of the logical block.

8. The method of claim 4, further comprising:
    marking at least one of the first instance and the second instant is invalid after the first version number is assigned to the third instance.

9. A method comprising:
storing, performed by a memory device, a first instance of a logical block of a memory device at a first physical location of the memory device;
assigning, performed by circuitry of a component that includes at east the memory device, a first version number value to the first instance;
storing, performed by a memory device, a second instance of the logical block of the memory device at a second physical location of the memory device;
assigning, performed by the circuitry of the component that includes at least memory device, a second version number value to the second instance;
storing performed by the memory device, a third instance of the logical block of the memory device at a third physical location of the memory device;
assigning, performed by the circuitry of the component that includes at least the memory device, the first version number value to the third instance of the logical block, wherein storing the third instance comprises copying one of at least a portion of the first instance and at least a portion of the second instance to the third physical location;
storing, performed by a memory device, a fourth instance of the logical block at a fourth physical location of the memory device, wherein the fourth instance of the logical block is stored after the second instance of the logical block is stored and before the third instance of the logical block is stored, and wherein the third instance comprises a portion of the first instance of the logical block from the first physical location to form a first portion of the third instance in the third physical location, a copy of the portion of the second instance of the logical block from the second physical location to form a second portion of the third instance in the third physical location, and a copy of a portion of the fourth instance of logical block from the fourth physical location of the memory device to form a third portion of the third instance in the third physical location; and
assigning, performed by circuitry of the component that includes at least the memory device, a fourth version number value to the fourth instance.

10. An apparatus comprising:
a memory array including memory cells in a memory device to store a plurality of version number values and a plurality of instances of a logical block, each of the version number values being assigned to an instance of the plurality of instances of the logical block; and
a component including at least the memory device, the component including circuitry configured to recycle the plurality of version number values after the plurality of version number values reaches a version quantity limit, wherein the component includes circuits contoured to set an instance quantity limit to indicate a maximum number of valid instances among the plurality of instances that is selected to exist at a time in the memory array, wherein the component includes circuitry configured to set version quantity limit as a function of the instance quantity limit, the version quantity limit indicating a quantity of version number values to be assigned to the plurality of instances of the logical block, wherein the component is to set the version quantity limit to be two times the instance quantity limit, wherein the memory array comprise a first block to store a first instant of the logical block, a second block to store a second instant of the logic block, and a third block to store a third instant of the logical block, and wherein the third instance in the third block comprises an update of a portion of the instance in the first block and a copy of a portion of the instance in the second block.

11. The apparatus of claim 10, wherein component is to remove an indication of the existence of the instance in the first block after the instance in the second block is stored.

12. An apparatus comprising:
a memory array including memory cells in a memory device to store a plurality of version number values and a plurality of instances of a logical block, each of the version number values being assigned to an instance of the plurality of instances of the logical block; and
a component including at least the memory device, the component including circuitry configured to recycle the plurality of version number values after the plurality of version number values reaches a version quantity limit, wherein the component includes circuitry configured to set an instance quantity limit to indicate a maximum number of valid instances among the plurality of instances that is selected to exist at a time in the memory array, wherein the component includes circuitry configured to set a version quantity limit as a function of the instance quantity limit, the version quantity limit indicating a quantity of version number values to be assigned to the plurality of instances of the logical block, and wherein the memory array comprise a first block to store a first instant of the logical block, a second block to store a second instant of the logic block, and a third block to store a third instant of the logical block, and wherein the third instance in the third block comprises an update of a portion of the instance in the first block and a copy of a portion of the instance in the second block.

13. The apparatus of claim 12, wherein the component is to correct the quantity of instances existing in the memory array when the quantity of instances existing in the memory array is greater than the instance quantity limit.

14. An apparatus comprising:
a memory array including memory cells in a memory device to store a plurality of version number values and a plurality of instances of a logical block, each of the version number values being assigned to an instance of the plurality of instances of the logical block; and
a component including at least the memory device, the component including circuitry configured to recycle the plurality of version number values after the plurality of version number values reaches a version quantity limit, wherein the component includes circuitry configured to set an instance quantity limit to indicate a maximum number of valid instances among the plurality of instances that is selected to exist at a time in the memory array, wherein the component includes circuitry configured to set a version quantity limit as a function of the instance quantity limit, the version quantity limit indicating a quantity of version number values to be assigned to the plurality of instances of the logical block, wherein the component includes circuitry configured to set the version quantity limit to be two times the instance quantity limit, wherein the component is to generate a selected instance of the plurality of instance after each fixed quantity of instances of the plurality of instances is generated, and wherein the memory array comprise a first block to store a first instant of the logical block, a second block to store a second instant of the logic block, and a third block to store a third instant of the logical block, and wherein the third instance in the third block comprises an update of a portion of the instance in the first block and a copy of a portion of the instance in the second block.

\* \* \* \* \*